United States Patent [19]

Boyd

[11] Patent Number: 4,583,422
[45] Date of Patent: Apr. 22, 1986

[54] PEDAL CRANK AND CHAIN WHEEL ASSEMBLY FOR BICYCLES

[76] Inventor: Winnett Boyd, 32 Restwell Crescent, Willowdale, Ontario, Canada

[21] Appl. No.: 420,695

[22] Filed: Sep. 20, 1982

[51] Int. Cl.$^4$ .......... G05G 1/14; B62M 1/02; F16D 41/24
[52] U.S. Cl. .......... 74/594.2; 192/5; 280/260
[58] Field of Search .......... 74/594.2, 594.1; 474/141, 152; 188/24.17, 27, 24 C, 24.19; 192/41 R, 6 R, 61, 5; 129/94; 280/219, 259, 260, 261; 308/179.5, 192, 235

[56] References Cited

U.S. PATENT DOCUMENTS

| 627,597 | 6/1899 | Scott | 74/594.2 |
|---|---|---|---|
| 652,972 | 7/1900 | Lusebrink | 74/594.2 |
| 689,984 | 12/1901 | Nowigk | 74/594.2 |
| 3,377,883 | 4/1968 | Thun | 74/594.2 |
| 3,888,334 | 6/1975 | Mack | 188/24 |
| 4,201,120 | 5/1980 | Segawa | 74/594.2 |
| 4,260,044 | 4/1981 | Foster | 280/259 |
| 4,261,449 | 4/1981 | Foster | 74/594.2 |
| 4,309,043 | 1/1982 | Brown | 74/594.2 |
| 4,355,706 | 10/1982 | Pan | 280/259 |
| 4,441,383 | 4/1984 | Segawa | 74/594.2 |

FOREIGN PATENT DOCUMENTS

| 915427 | 11/1946 | France | 74/594.2 |
|---|---|---|---|
| 447991 | 5/1949 | Italy | 188/24 |
| 456170 | 11/1936 | United Kingdom | 280/259 |

Primary Examiner—Alexander Grosz
Assistant Examiner—Vinh Luong

[57] ABSTRACT

A chainwheel is supported on a pedal crank in a bicycle, in which lost motion is provided about the axis of the crank in order to prevent lock up when using a pedal crankshaft operated brake, by supporting the inner periphery and one side of the chain wheel on a chain wheel carrier, and taking up play on the other side of the chain wheel by using a nut to deform a resilient washer into a cone to prevent movement of the chain wheel relative to the crank other than about its axis. The nut may be an inner race of a crankshaft bearing if the pedal crank is integral with a pedal crankshaft. A spring controlling relative movement of the chain wheel about the crank is made progressive by causing it to wrap onto a cylindrical surface concentric with the crankshaft axis.

5 Claims, 6 Drawing Figures

PEDAL CRANK AND CHAIN WHEEL ASSEMBLY FOR BICYCLES

FIELD OF THE INVENTION

This invention relates to bicycles having brakes activated by a pedal crankshaft operator, and more particularly to pedal crank and chain wheel assemblies for such bicycles.

BACKGROUND OF THE INVENTION

It is known that bicycles having pedal crankshaft operated brakes are subject to a lock-up condition in which the forward pedalling required to release the rear brake of the machine is impossible because the rear brake prevents rotation of the rear wheel. A solution to this problem was disclosed as long ago as 1949 in Italian Pat. No. 447,991 (Lombardi et al) which shows a bicycle with lost motion between its pedal crankshaft and its chain wheel, spring bias being provided to make the lost motion available when forward pedalling follows braking. A similar arrangement is disclosed in U.S. Pat. No. 3,888,334, issued June 10, 1975 to Mack, whilst an improved arrangement is disclosed in my own copending U.S. patent application Ser. No. 302,537 now U.S. Pat. No. 4,462,488 issued date July 31, 1984 filed Sept. 16, 1981.

This last arrangement provides effective prevention of lockup combined with smooth operation through provision of a highly progressive spring bias on the lost motion means.

All of the above arrangements utilize a chain wheel which is supported for rotation on the crankshaft either directly or through a sleeve, with some provision for restraining axial displacement of the chain wheel. A potential problem with such arrangements is that as wear occurs, the chain wheel will become a progressively looser fit on the crankshaft or sleeve, and will tend to wobble, thus both impairing operation of the bicycle and aggravating the wear problem. It is most important for commercial acceptability of a pedal crankshaft operated brake system that the necessary anti-locking device does not impair operation of the bicycle or decrease its reliability.

SUMMARY OF THE INVENTION

According to the invention, a pedal crank and chain wheel assembly for bicycles comprises a pedal crank having a crankshaft end, a chain wheel coacting with and inwardly adjacent the pedal crank, a lost motion coupling supporting the chain wheel on the crankshaft end, and a spring acting between the pedal crank and the chain wheel to take up the lost motion of the lost motion coupling, the lost motion coupling comprising an annular chain wheel carrier concentric with the chain wheel, a shoulder formed at the crankshaft end of the pedal crank and restraining the chain wheel carrier against radial or axially outward movement, the chain wheel carrier having a hub with an external cylindrical bearing surface engaging an internal periphery of the chain wheel, and a flange with an annular support surface engaging an outer surface of the chain wheel in an annular zone, a resilient annular washer having on its outward facing surface an inner annular support surface engaging the carrier hub and an outer annular support surface engaging an inner surface of the chain wheel in an annular zone spaced outwardly of said internal periphery, an external screw thread formed on said crankshaft end concentric with the chain wheel and inward of the shoulder, and a nut engaged with the screw thread and having an annular land engaging an inner surface of the annular washer radially outward of its inner annular bearing surface whereby resiliently to deform the washer into a frustum of a cone so as to take up play between the chain wheel, the outer annular support surface of the washer and the annular support surface of the carrier. With such an arrangement, play between the chain wheel and its lateral supporting surfaces is readily taken up, both initially and to take up subsequent wear, simply by rotating the nut, whilst the resilient deformation of the washer causes it to act as a lock-washer maintaining the desired position of the nut. The absence of play in the chain wheel diminishes rocking and thus diminishes the rate at which wear occurs, enabling the initial adjustment to be maintained for long periods. Where the pedal crank is formed in one piece with the pedal crankshaft, the nut may be formed by an inner race of a bearing supporting the crankshaft in the bottom bracket of the bicycle.

Preferably the spring acting between the chain wheel and the pedal crank is an elongated resilient member which has ends engaging supports on those two parts and intermediately forms a loop extending around a substantial portion of the periphery of a surface concentric with the crankshaft end, such that an increasing portion of the length of the spring is wrapped onto the concentric surface as the lost motion of the lost motion coupling is taken up, whereby the effective stiffness of the spring is progressively increased.

Further features of the invention will be apparent from the following description of preferred embodiments.

SHORT DESCRIPTION OF THE DRAWINGS

DESCRIPTION OF THE PREFERRED EMBODIMENTS

Figure 1:
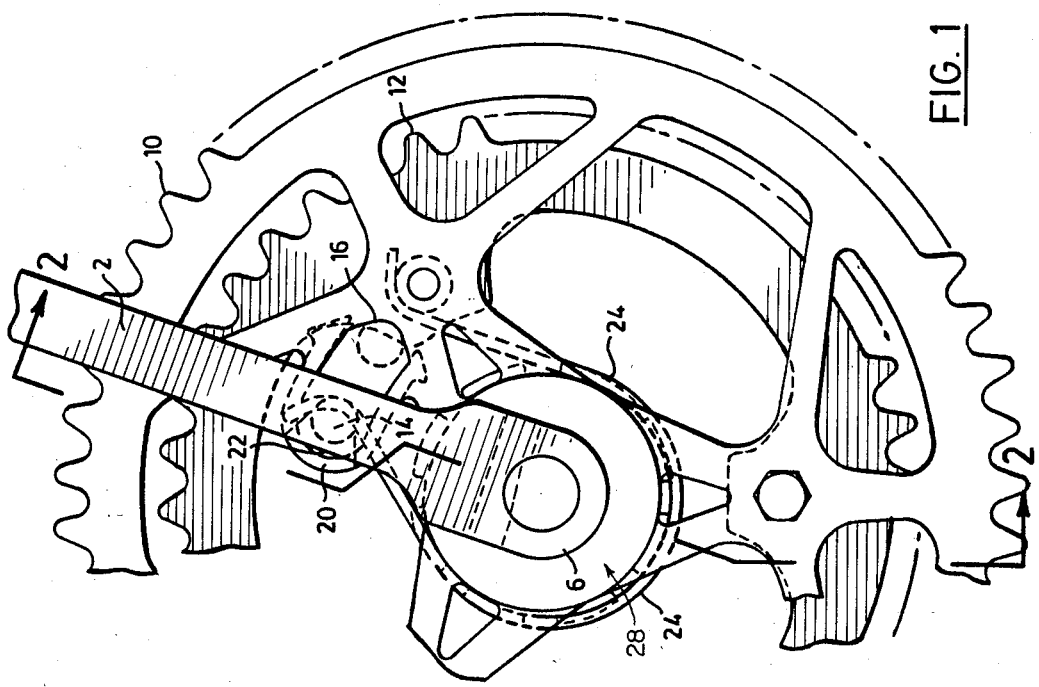
FIG. 1 is a broken away side elevation of a first embodiment of a chain wheel and pedal crank assembly in accordance with the invention, applied to a pedal crankshaft.
Figure 2:
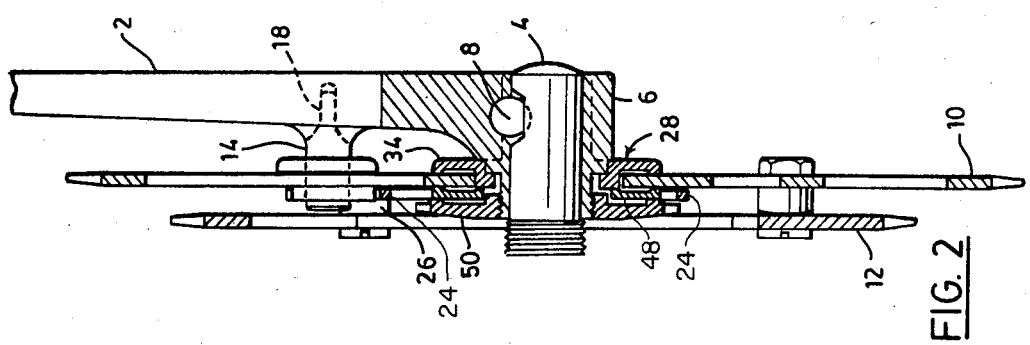
FIG. 2 is a section on the line 2—2 in FIG. 1.

Referring to the embodiment of FIGS. 1 and 2, a pedal crank 2 is shown fitted to a pedal crankshaft 4 to which a crankshaft end 6 of the crank is secured in conventional manner by inserting a cotter pin (not shown) passed through a passage 8 in the end 6 to engage a flat on the shaft 4. The outer end of the crank (not shown) supports a pedal in conventional fashion, and the crankshaft end 6 concentrically supports a chain wheel 10 which in the example shown is part of a multiple chain wheel assembly including a second chain wheel 12. The form of the radially outward portions of the chain wheel or chain wheel assembly form no part of the present invention, and the term chain wheel is used throughout this specification and the appended claims to refer collectively to both single chain wheels and chain wheel assemblies of whatever type.

Drive is transmitted from the crank 2 to the chain wheel 10 through a coupling including a pin 14 projecting inwardly from the crank. In order to provide lost motion between the chain wheel and the crank 2, the chain wheel 10 defines a slot 16. Both the pin 14 and the slot 16 may be provided by securing appropriate components to pedal cranks and chain wheels of conventional design. Thus the pin 14 may be brazed to the crank 14 after a peg 18 is inserted in a drilling in the crank, which slot may be formed by a loop 20 brazed to the edge of an opening in the chain wheel. In the absence of forward (clockwise as shown in FIG. 1) torque applied to the crank 2, the pin 14 rests against a resilient pad 22 at the outer end of the slot being urged to that position by a spring 24 which extends between a first end loop engaging a slot in the pin 14, around much of the periphery of the crankshaft end, and back to a second end loop engaging a pin 26 attached to the chain wheel 10. In the example shown, the pin 26 is conveniently formed by a post securing the chain wheel 12 to the chain wheel 10.

Figure 5:
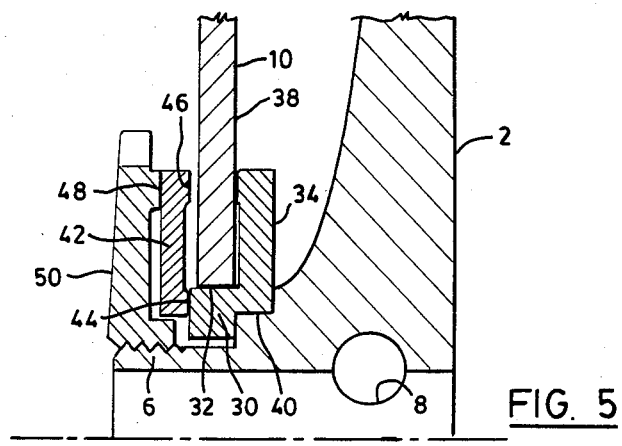
FIGS. 5 and 6 are enlarged, fragmentary radial sections of the first embodiment, ilustrating stages in the adjustment of the assembly.
Figure 6:
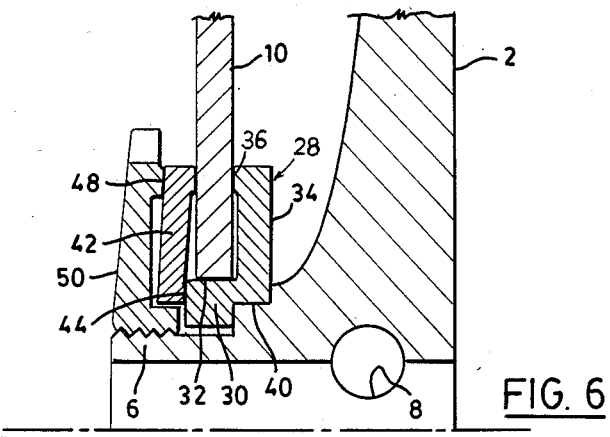

The chain wheel 10 is supported on the crankshaft end 6 of the crank 2 by an annular chain wheel carrier 28 which has a hub portion 30 (see FIGS. 5 and 6) with an external cylindrical bearing surface 32 engaging the internal periphery of the chain wheel and a flange 34 providing an annular support surface 36 engaging the outer surface 38 of the chain wheel. Preferably the flange 34 is slightly recessed radially inwardly of the support surface 36 to allow for wear of the latter. The carrier 28 is supported on a shoulder 40 formed on the crank at its crankshaft end 6.

The carrier 28 supports the chain wheel 10 against radial or axially outward movement whilst permitting angular movement of the chain wheel relative to the crank 2. In order to prevent inward axial movement and nutation of the chain wheel, a washer 42 of resilient material such as spring steel is provided having a radially inward annular support surface 44 engage the hub portion 30, and a radially outward support surface 46 which can be moved inwardly driving adjustment from the position shown in FIG. 5 to the position shown in FIG. 6 so that the washer assumes a frustoconical form and takes up any play between the washer 42, the chain wheel 10 and the carrier 28. The washer is deformed by pressure from an annular land 48 on a nut 50 threaded onto an external thread formed on the inner extremity of the crankshaft end 6 of the crank 2. The nut, once adjusted to take up play, is held against movement by the resilience of the washer 42. This locking action is achieved without the necessity for any of the reaction from the washer to be sustained by the chain wheel 10. Thus play in the system can be accurately taken up and the adjustment thereafter maintained without appreciable frictional loading on the chain wheel.

Figure 3:
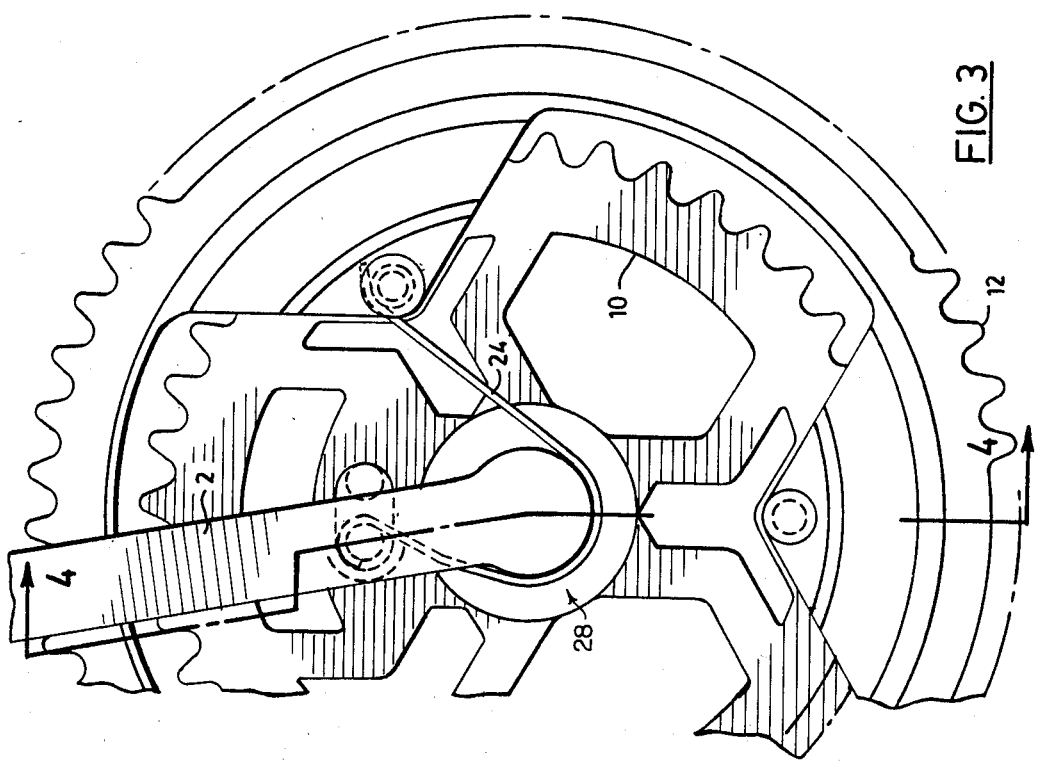
FIG. 3 is a view similar to FIG. 1 of a second embodiment of the invention, in which the pedal crank is integral with the pedal crankshaft.
Figure 4:
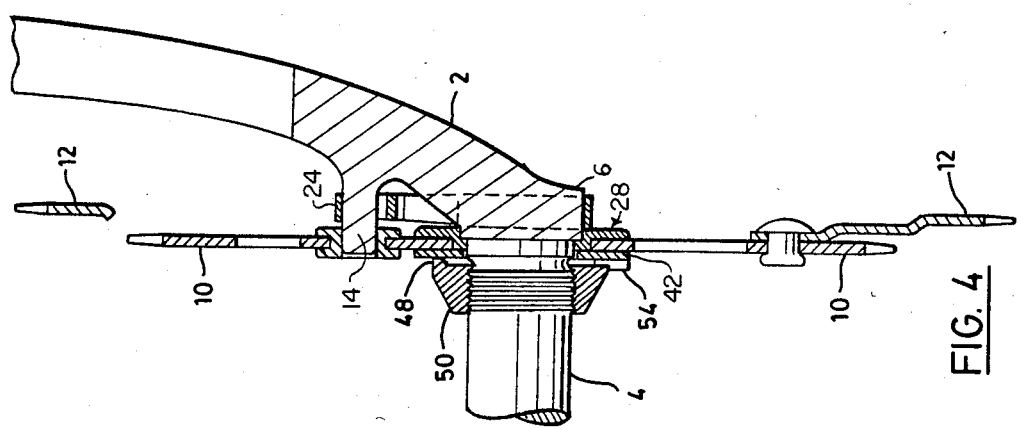
FIG. 4 is a section on the line 4—4 in FIG. 3.

The embodiment of FIGS. 3 and 4 is generally similar to that of FIGS. 1 and 2 and the same reference numerals are applicable to corresponding parts; only the differences will be described. In this embodiment, the crankshaft 4 is formed integrally with the crank arm 2. This enables the nut 50 to be formed by the inside race of one of the bearings supporting the crankshaft in the bottom bracket of the bicycle. If the race does not have a land 48, a separate annular washer 54 may be provided to form such a land.

Both embodiments operate similarly. When forward pedalling torque is applied to the crank 2 and its counterpart on the other side of a bicycle in which the assembly is installed, the pin 14 tends to move clockwise in the slot 16 as the pedalling torque is transmitted to the chain wheel through the spring 24. The deformation of the spring increases its wrap onto an annular surface, formed by the outer periphery of the washer 42 in the FIGS. 1 and 2 embodiment and the end 6 of the crank arm in the FIGS. 3 and 4 embodiment. This increased wrap reduces the effective free length of the spring and thus increases its stiffness, providing the desired progressive action. When sufficient pedalling torque has been developed, the pin 14 reaches the other end of the slot 16 and additional torque is thereafter transmitted directly from the crank 2 through the pin 14 to the chain wheel.

Whilst I have described the chain wheel carrier as a separate part, it will be understood that its functions may be performed by integral portions of the crankshaft end of the pedal crank.

I claim:

1. A pedal crank and chainwheel combination for a bicycle, comprising a pedal crank having a crankshaft end, a chain wheel coacting with and inwardly adjacent the pedal crank, a lost motion coupling including means supporting the chain wheel on the crankshaft end for relative motion about the axis of the crankshaft, and torque responsive means acting between the pedal crank and the chain wheel to take up the lost motion of the lost motion coupling, the means supporting the chainwheel comprising an annular chain wheel carrier concentric with the chain wheel, a shoulder formed at the crankshaft end of the pedal crank and restraining the chain wheel carrier against radial or axially outward movement, the chain wheel carrier having a hub with an external cylindrical bearing surface engaging an internal periphery of the chain wheel, and a flange with an annular surface engaging an outer surface of the chain wheel in an annular zone, a resilient annular washer on its outward facing surface, an inner annular support surface engaging the carrier hub and an outer annular support surface engaging an inner surface of the chain wheel in an annular zone spaced outwardly of said internal pheriphery, an external screw thread formed on said crankshaft end concentric with the chain wheel and inward of the shoulder, and a nut engaged with the screw thread and having an annular land engaging an inner surface of the annular washer radially outward of its inner annular bearing surface to deform the washer into a frustum of a cone, whereby to take up play between the chain wheel, the outer annular support surface of the washer and the annular support surface of the carrier, and prevent relative motion of the chainwheel and the crankshaft other than about the axis of the latter.

2. A combination as claimed in claim 1, further including a pedal crankshaft integral with the pedal crank.

3. A combination as claimed in claim 2, wherein the nut forms the inner race of a pedal crankshaft bearing.

4. A combination as claimed in claim 1, wherein the annular support surface of the flange of the chain wheel carrier engages an annular zone of the chain wheel outer surface spaced radially outward of the chain wheel inner periphery.

5. A combination as claimed in claim 1, 2, 3 or 4, wherein the torque responsive means acting between the chain wheel and the pedal crank is an elongated resilient member which has ends engaging supports on those two parts and intermediately forms a loop extending around a substantial portion of the periphery of a surface concentric with the crankshaft end, such that an increasing portion of the length of the spring is wrapped onto the concentric surface as the lost motion of the lost motion coupling is taken up, whereby the effective stiffness of the spring is progressively increased.

* * * * *